June 19, 1951

H. T. HOFFMAN ET AL 2,557,741

ELECTRIC MOTOR TELEMETRIC SYSTEM

Filed Oct. 25, 1947

*INVENTORS*
HOWARD T. HOFFMAN
and ANTHONY J. HORNFECK
BY
Raymond D. Junkins.
*ATTORNEY*

Patented June 19, 1951

2,557,741

UNITED STATES PATENT OFFICE 2,557,741

ELECTRIC MOTOR TELEMETRIC SYSTEM

Howard T. Hoffman, Cleveland, and Anthony J. Hornfeck, Lyndhurst, Ohio, assignors to Bailey Meter Company, a corporation of Delaware Application October 25, 1947, Serial No. 782,112

3 Claims. (Cl. 318—18)

This invention relates to telemetric systems which indicate or otherwise exhibit the positions of a transmitting member varying in accordance with some changing condition, and more particularly to such systems in which the indicating or exhibiting means is located at a point extremely remote from the transmitting member.

In the patent to C. J. Weible, No. 2,159,413, there is disclosed a telemetric system in which the positions of a transmitting member are indicated at a plurality of remote receiving stations. At each of the receiving stations is a motor for positioning an indicating member, and the motor includes in each case a pair of shading pole windings which are energized by a continuously excited field. Rotation of the motor in opposite directions is accomplished by short circuiting one or the other of the windings. One of the windings at the first receiver is connected to contacts at the transmitter, and the other winding is connected to contacts at the receiver. A closing of the contacts at the transmitter and at the receiver short circuits the windings so that current flows therein as a result of voltage induced from the field winding. If the circuits to both of the pole windings are open or closed, the motor remains stationary, while a short circuiting of one of the windings results in an operation of the motor in one direction or the other depending upon which of the windings is short circuited. The voltage induced in the shading pole windings from the field winding is comparatively small and, where the receiver is located a considerable distance from the transmitter, the resistance of the circuit including the transmitter contacts is so great that insufficient current flows in the pole windings of such circuit to effect operation of the motor. In order that an operation of the motor may be obtained in response to signals from the transmitter over long distances, it is proposed that a relay be located at the receiver and operated in response to the signals for controlling the short circuiting of the pole winding. It is also proposed that a relay be used in a phasing circuit for the motors of the transmitter and the receiver so that the line voltages are maintained small and operation of the receiver motor is assured.

An object of our invention is to provide an improved telemetric system. Another object is to provide a telemetric system which permits the locating of a receiver comparatively long distances from the transmitter. Yet another object is to provide a system for transmitting signals at low voltages over long lines and effecting operation of a motor at a receiver in response to such signals. Another object is to provide a system for transmitting signals at low D.-C. voltages over telephone lines and effecting operation of a motor at a receiver in response to such signals. Still another object is to provide an improved telemetric system having a relay located at a receiver and operating to control the operation of a motor at the receiver in response to signals received from a transmitter. Other objects will appear in the course of the following description.

In the accompanying drawing there is shown for purposes of illustration two forms which our invention may assume in practice.

Figure 1:
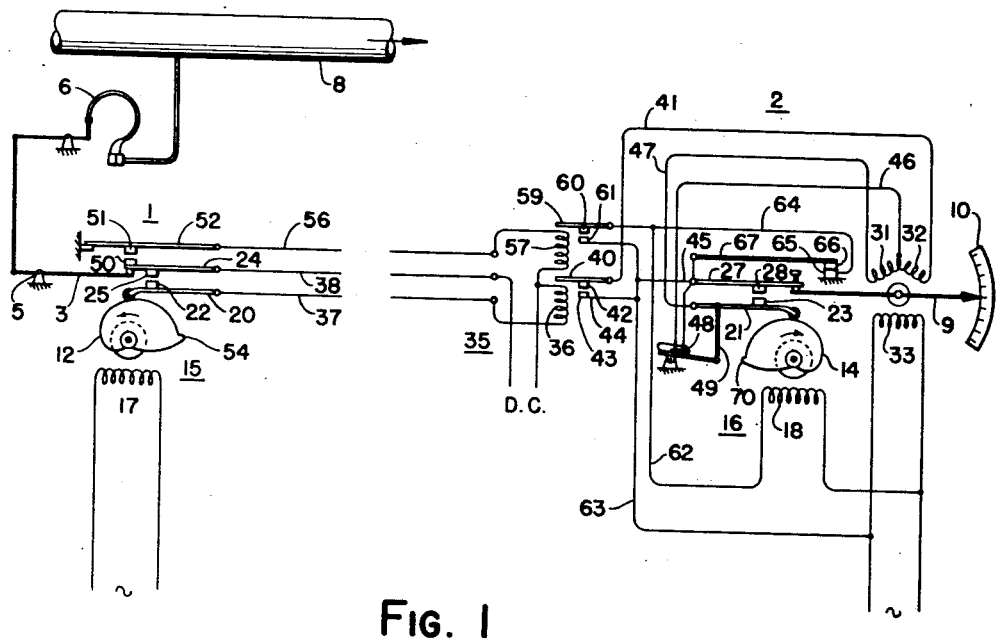
Fig. 1 is a schematic diagram of a telemetric system embodying our invention.

Referring to the drawing, and more particularly to Fig. 1, it will be noted that there is shown a transmitting station *I* operating in response to changes in some variable condition for transmitting signals to a receiver, generally designated *2*. The station *I*, as shown herein, includes a transmitting member *3* pivoted at *5* and operatively connected to a device *6*, such as a Bourdon tube, responsive to a variable condition which may be, as shown herein, the changes in temperature or pressure in a conduit *8*. The member *3* could as well be operated in response to changes in other conditions, such as the flow of fluid, liquid level, etc. Arranged at the receiver is a combined receiving and indicating member *9* which is to be moved to positions corresponding to those of the member *3*, and the member *9* cooperates with a scale *10* to provide a reading of the condition measured.

At the transmitting and receiving stations are similary shaped substantially uniform rise cams *12* and *14*, respectively, rotated in the direction of the arrows at a constant speed by motors *15*, *16* having windings *17* and *18* energized from a source of alternating current, the winding *18* being connected in a circuit shortly to be described for holding the motor *16* in phase relationship with motor *15*.

Periodically reciprocated by the cams *12* and *14* are pivoted members *20* and *21* carrying contacts *22* and *23* respectively. Positioned by and in accordance with the member *3* is a pivoted member *24* carrying a contact *25* engageable by the contact *22*. At the receiving station *2* is a similar pivoted member 27 carrying a contact 28 engageable by the contact 23, and the member 27 is arranged to be positioned by the indicating member 9. When the cams 12 and 14 are rotated in exact phase the point on the contour of cam 12 engaged by the member 20 is the same as that on cam 14 engaged by the member 21. If the position of the indicating member 9 corresponds with that of the transmitting member 3, the contact 23 will engage contact 28 at the same instant as contact 22 engages the contact 25. If, however, there is a change in the position of member 3, then the instant at which the contact 22 engages contact 25 will lead or lag the instant at which the contact 23 engages the contact 28 by an amount proportional to the change in the position of the member 3. The position of the indicating member 9 will then be corrected, as will be described, by an amount proportional to the change in position of the member 3, so that it is again in correspondence therewith.

The indicating member 9 is shown diagrammatically as being positioned by a reversible motor having opposed shading poles 31, 32, and a field winding 33 continuously energized from a source of alternating current. Rotation of the motor in one direction is effected by short circuiting the pole winding 31, while rotation in the opposite direction is effected by short circuiting the winding 32. If the pole windings are both open circuited or both short circuited, the motor remains stationary and is not urged to rotation in either direction. For controlling the short circuiting of the pole winding 32 there is provided a relay 35 at the receiver having a winding 36 connected at one end directly to a source of direct current, and connectable at its other end through a conductor 37, the contacts 22, 25, and a conductor 38 to the source of direct current. A relay armature 40 is connected by a conductor 41 to one end of the pole winding 32 and carries a contact 42 engageable with a stationary contact 43 which is connected by conductors 44, 45 and 46 to the other end of this pole winding. When the relay winding 36 is energized, the armature 40 is actuated to bring contact 42 into engagement with contact 43 and short circuit the pole winding 32. The pole winding 31 is connected at one end through the conductor 46 and the pivoted member 27 to the contact 28, and is connected at its other end through a conductor 47 and the pivoted member 21 to the contact 23. A short circuiting of the winding 31 is obtained on engagement between contacts 23, 28.

To provide for simultaneous deenergization of the pole windings there is provided in the common conductor 46 a mercury switch 48 positioned through a link 49 by the member 21. At a predetermined point in the travel of the member 21 the switch 48 is actuated to open the circuits through the pole windings 31 and 32. Upon return of the member 21 to another predetermined position, the switch 48 is closed so that the energizing of the pole windings may be controlled by the pairs of contacts 22, 25 and 23, 28. The switch 48 is arranged to close before the contacts 22, 25 or 23, 28 disengage regardless of the positions of the members 3 and 9, and to open while the contacts 22, 25 or 23, 28 are engaged regardless of the position of the members 3 and 9. In other words, energization of the pole windings 31, 32 is controlled by contacts 23, 28 and 22, 25, respectively, whereas deenergization is controlled by the switch 48.

The operation of the system so far described is as follows: Assuming that the positions of the members 3 and 9 correspond with each other and that the cams 12 and 14 are rotating in phase at the same speed, the members 20 and 21 will be actuated to engage contacts 22, 23 with contacts 25, 28 at the same instant. Engagement between contacts 22, 25 results in the energizing of the relay winding 36 to close contacts 42, 43 and short circuit the pole winding 32. Engagement between contacts 23, 28 results in a direct short circuiting of the pole winding 31. With both pole windings short circuited at the same instant, the motor for the indicating member 9 remains stationary. If the condition changes so that the transmitting member 3 moves the contact 25 further from the contact 22, engagement between contacts 23, 28 will be obtained before there is an engagement between contacts 22, 25, and the short circuiting of the pole winding 31 will result in an operation of the indicator motor to move contact 28 away from contact 23. A change in the condition to move the contact 25 nearer to the contact 22 will result in an operation of the armature 40 to short circuit the pole winding 32 before the pole winding 31 is short circuited and effect operation of the indicator motor to position the contact 28 nearer to contact 23.

The cams 12 and 14 may be out of phase when the system is first put into operation, or the cams may depart from the proper phase relationship during operation due to differences of friction in the motors. In order that they may be restored to proper phase relationship there is provided means whereby the angular position of the cam 14 is periodically compared with the position of the cam 12 and, if not in agreement, the motor 16 is momentarily stopped until the proper agreement is restored. To obtain correction in phase relationship there is provided on the pivoted member 24 a contact 50 which is engageable with a contact 51 carried by a pivoted member 52. Formed on the cam 12 is a projecting portion 54 which is adapted to lift the member 20 high enough to swing the member 24 so that its contact 50 engages the contact 51 once during each revolution of the cam. The member 52 is connected by a conductor 56 to one end of a winding 57 of the relay 35, and the other end of this relay winding is connected as shown to the source of D.-C. When the contact 50 engages the contact 51, the relay winding 57 is energized from the D.-C. source through conductor 38, contacts 50, 51, and conductor 56. A relay armature 59 carries a contact 60 engageable with a stationary contact 61 for completing a circuit from the A.-C. source through the motor winding 18, a conductor 62, the contacts 60, 61, and a conductor 63 to the A.-C. source again. Another circuit is provided for the motor winding 18 through the conductor 62, a conductor 64, contacts 65, 66, a pivoted member 67, and the conductors 45, 63 to the source of alternating current. The contact 65 is supported in a fixed position, and the contact 66 is fixed to the pivoted member 67. A projecting portion 70 on the cam 14 is similar to the projecting portion 54 on the cam 12 and is operable to lift the pivoted member 21 sufficiently to swing the pivoted member 27 so as to engage the member 67 and effect a movement of contact 66 away from contact 65.

The contacts 65 and 66 are normally in engagement with each other so as to complete the circuit through the motor winding 18 for effecting operation of the motor to drive the cam 14. If the cams 12 and 14 are in the proper phase relationship, the contact 66 is moved away from contact 65 at the same instant that contact 50 engages contact 51 and energizes the relay winding 57 for closing the contacts 60, 61. The circuit through the motor winding 18 is then completed through the contacts 60, 61 as soon as it is broken at the contacts 65, 66, and the motor continues to drive the cam 14 in phase with the cam 12. If the cam 14 is out of phase with the cam 12, the opening of the contact 65, 66 results in a stopping of the motor driving the cam 14 until the cam 12 is again in phase with it and completes the motor circuit to drive the cam until contacts 65, 66 again engage each other.

Figure 2:
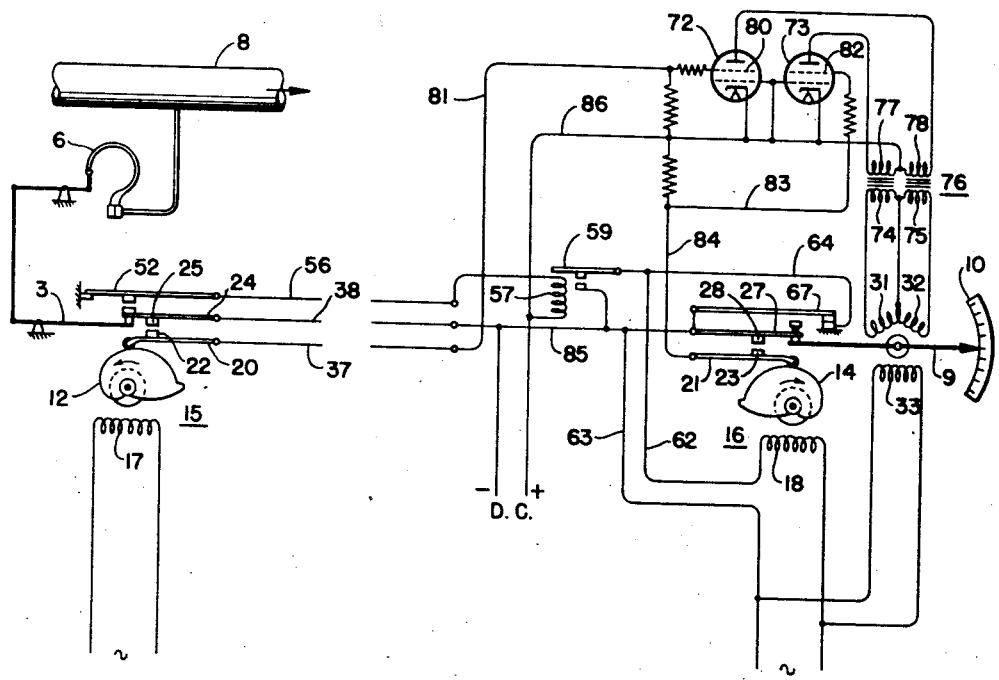
Fig. 2 is a schematic diagram of a telemetric system similar to that of Fig. 1 and embodying our invention in another form.

Fig. 2 shows a system like that of Fig. 1 except that electronic tubes 72 and 73 are provided for controlling the short circuiting of the pole windings 31 and 32 in response to signals produced as a result of opening and closing the contacts 22, 25 and 23, 28. The pole windings 31, 32, are connected to the primary windings 74, 75 of a step-up transformer 76, and the secondary windings 77, 78 of this transformer are connected at one end to the cathodes of the tubes 72, 73 while the other ends of the secondary windings are connected to the anodes of the tubes. A grid 80 of tube 72 is connected by a conductor 81 and the conductor 37 to the pivoted member 20, and a grid 82 of the tube 73 is connected by conductors 83, 84 to the pivoted member 21. The pivoted members 24, 27 are connected respectively by conductors 38 and 85 to the negative side of the D.-C. source, and the cathodes of the tubes 72, 73 are connected by a conductor 86 to the positive side of the D.-C. source. When the contacts 22, 25 and 23, 28 are engaged, a negative potential is placed on the grids 80, 82 with respect to the cathodes and no current flows in the plate circuits of the tubes. When the contacts 22, 25 and 23, 28 are disengaged, the grids and cathodes are at the same potentials and current flows through the plate circuits and the secondary windings 77, 78. The flow of current in the secondary windings results in a decrease in the reactance of the primary windings and a short circuiting of the pole windings 31, 32. If the contacts 22, 25 and 23, 28 open and close at the same instant, the pole windings are short circuited and open circuited at the same time and the indicator motor remains stationary. If the transmitting member 3 and the indicating member 9 are in positions that do not correspond, the opening and closing of contacts 22, 25 either lead or lag the opening and closing of contacts 23, 28, and one or the other of the pole windings will be short circuited to effect operation of the indicator motor in a direction to bring the indicator into correspondence with the transmitting member 3. The motors 15 and 16 are held in phase in the same manner as described above in connection with the system of Fig. 1.

While there is described in this application two forms which our invention may assume in practice, it will be understood that the invention may be modified and embodied in various other forms without departing from its spirit or the scope of the appended claims.

What we claim as new and desire to secure by United States Letters Patent is:

1. A telemetric system including in combination, a movable transmitting member, a movable receiving member remotely located from said transmitting member, means for positioning said transmitting member in response to changes in the magnitude of a variable, a reversible motor for positioning said receiving member, said motor having a continuously energized field winding and a pair of opposed shading poles, an A.-C. circuit including two sets of contacts adjacent said receiving member and operable to effect a short-circuiting of either one or both of said shading poles, a relay coil at the receiving end controlling one of said sets of contacts, a low D.-C. circuit operating said relay coil during time intervals varying with the position of said transmitting member, and means operating to close the other of said sets of contacts during time intervals varying with the position of said receiving member.

2. A telemetric system including in combination, a transmitter having a movable transmitting member, a receiver remotely located from said transmitter and having a movable receiving member, cam members of similar shape at said transmitter and said receiver, motors for rotating said cam members, a pivoted contactor engaging each of said cam members, a pivoted contactor at said transmitter adjustable by said transmitting member for engagement during different intervals by the contactor engaging said transmitter cam, a pivoted contactor at said receiver adjustable by said receiving member for engagement during different intervals by the contactor engaging said receiver cam, a motor having opposed shading poles for positioning said receiving member, a relay at said receiver, an A.-C. circuit controlled by said relay for short-circuiting one of said shading poles, a D.-C. circuit including the pivoted contactors of said transmitter for controlling the energizing of said relay, and an A.-C. circuit including the pivoted contactors at said receiver for controlling the short-circuiting of the other of said shading poles.

3. A system like that of claim 2 but including means for holding said cams in the proper phase relationship, said holding means including parallel A.-C. and D.-C. circuits for controlling the operation of the motor driving said receiver cam, normally open contacts for controlling the D.-C. circuit, a relay at said receiver operable when energized to close said contacts, normally open contactors at said transmitter for controlling the energizing of said relay, normally closed contactors at said receiver for controlling the parallel A.-C. circuit, and means on said cams for closing the contactors at said transmitter and opening the contactors at said receiver, said last mentioned means effecting periodic closing and opening of said contactors at the same instant when said cams are in the proper phase relation.

HOWARD T. HOFFMAN.
ANTHONY J. HORNFECK.

REFERENCES CITED

The following references are of record in the file of this patent:

UNITED STATES PATENTS

| Number | Name | Date |
| --- | --- | --- |
| 2,046,676 | Dueringer | July 7, 1936 |
| 2,134,901 | Wey | Nov. 1, 1938 |
| 2,215,254 | Ryder | Sept. 17, 1940 |
| 2,231,569 | Dickey | Feb. 11, 1941 |
| 2,273,532 | Lovell | Feb. 17, 1942 |